Oct. 16, 1956 C. O. BALL 2,767,101
STERILIZATION OF NOVEL CREAM-STYLE CORN PRODUCTS
Filed June 17, 1953

United States Patent Office 2,767,101
Patented Oct. 16, 1956

2,767,101

STERILIZATION OF NOVEL CREAM-STYLE CORN PRODUCTS

Charles Olin Ball, New Brunswick, N. J., assignor to The United Products Company, Westminster, Md., a corporation of Maryland Application June 17, 1953, Serial No. 362,381

8 Claims. (Cl. 99—186)

The present invention relates to novel sterilized corn products, more particularly canned cream style corn products, and to the processes of sterilizing these products.

It is an object of the present invention to produce canned cream style corn products which may be both more rapidly heat sterilized and with a lower degree of heat decomposition or caramelization of the heat sensitive ingredients than is possible by means of prior art processes.

It is a further object of the present invention to produce canned cream style corn products which are of enhanced liquid lubricating properties, without a consequent loss in viscosity or body, by the incorporation of substantial amounts of soluble solids into the layer of finely divided corn component. This permits more rapid dispersion under mechanical agitation of the heat sterilized finely divided component of the multilayer stratified product which will be described below.

The above enumerated objects, as well as other objects, together with the advantages of the invention, will be readily comprehended by those skilled in the art upon reference to the following description, taken in conjunction with the appended drawings.

Cream style corn products being, in general, somewhat thick, viscous products present a serious problem to the canning industry. For not only is corn itself one of the most difficult of food products to sterilize to prevent bacterial spoilage, but because of its viscous nature, the rate of heat transfer from the outer portions of the can or container during heat sterilization is greatly impeded. Because of its propensity for bacterial spoilage, a high degree of heat (about 240–250° F.) for times varying from approximately 25 minutes to 180 minutes, depending upon the size of can, proportions existing between quantities of various components and other factors, is required to provide safety from spoilage. Since the thick, viscous, cream style corn product will then transfer heat slowly, that portion of the contents near the walls of the can is prone to be overheated during the long period of sterilization required to heat the innermost confines of the contents of the can.

Figure 1:
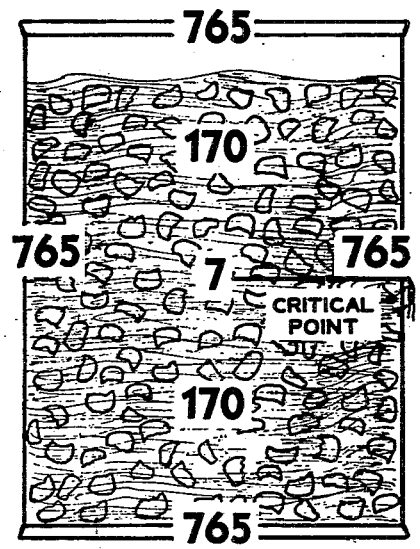
Figure 1 is a longitudinal cross-section of a container filled with the conventional pre-mixed cream style corn product.
Figure 2:
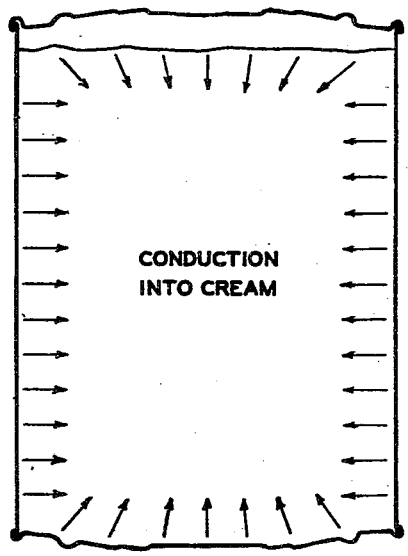
Figure 2 is the same view as in Figure 1 showing the mode of heat transfer during sterilization.

This problem may be demonstrated by reference to Figures 1 and 2 of the appended drawings. In a viscous, thick product heat transfer is effected by slow conduction, as shown in Figure 2, rather than the preferable, more rapid convection transfer. Figure 1 shows the heating rate of a No. 2 can of pre-mixed cream style corn which has been heated for 46 minutes at 250° F. The numbers shown inside the figure represent the percentage of lethal heat which has reached the position in the can indicated by the percentage numeral. As will be seen, the innermost position (or critical point) of the can has received only 7% of the lethal heat necessary to sterilize the product. As will be apparent, this retarding of sterilization of the innermost portion of the contents becomes more acute the larger the can is and is an increasingly vexing problem with respect to the large No. 10 or institution size can. The sterilization of the innermost portion of the can may be accomplished by continuing the sterilization for a longer period of time or by increasing the external temperature during the sterilization. This, however, results in greater thermal decomposition or caramelization of the heat sensitive food material in the outer portions of the contents with serious impairment in color, flavor and nutritive value of the product. The present invention comprises a novel method, and the cream style corn product resulting therefrom, for alleviating this problem.

Cream style corn usually contains a finely divided component of ground corn kernels and it is this component which contributes greatly to the "creamy" property of the product. There are also the discrete particles comprising whole kernels, and including partially divided kernels, and there is a liquid solvent component which may be either water or an aqueous solution of salt, sugar and other soluble solids, which is referred to in the industry as "brine." The invention is particularly applicable to a stratified cream style corn product and sterilization process which is the subject of one of my issued patents and which is described below.

Figure 3:
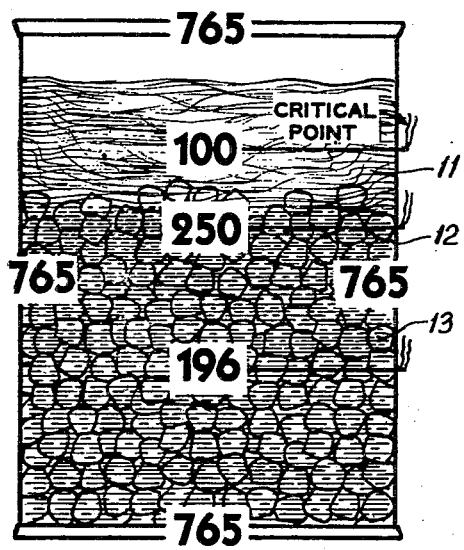
Figure 3 is a longitudinal cross-section of a container filled with a stratified cream style corn product in accordance with the process of my issued Patent No. 2,502,197.
Figure 4:
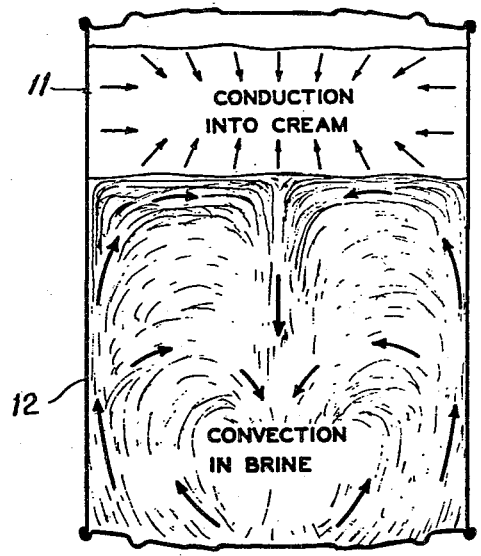
Figure 4 is the same view as in Figure 3 showing the mode of heat transfer during sterilization.

There is disclosed in my issued Patent No. 2,502,197 of March 28, 1950, assigned to The United Products Company, a process for sterilizing cream style corn permitting a reduction of sterilization heat and time and which provides superior taste and flavor properties. This process is based essentially upon the stratification of the finely ground portion of the corn with a small amount of water into layer 11 of Figure 3 of the drawings and the formation of another layer 12 of the whole kernels 13 and partially divided kernels which make up the discrete particles immersed in the brine of this second layer 12. The brine is an aqueous solution of sugar, salt and other soluble solids which may be dissolved therein as desired. This process permits heating by convection currents in the brine layer 12 as shown in Figure 4. The layer 11 of finely divided corn (also described as the cream phase), because of its viscosity is heated entirely by conduction. While the rate of heat transfer by conduction is lower, the time required for heating is not excessively long, for the cream layer is relatively thin dimensionally and the temperature rises rapidly at all faces of the cream layer. This may be shown by comparing Figure 3 with Figure 1. Figure 3 shows a No. 2 size can of cream style corn sterilized in accordance with the process of Patent No. 2,502,197 at 250° F. for 46 minutes (same as for the pre-mixed product of Figure 1). The numbers shown are the percentages of lethal heat necessary to sterilize the product to reach that portion of the contents of the can. As noted, even the most inaccessible part of the contents of the can (the middle of the cream layer) receives 100% of the lethal heat necessary to sterilize it whereas in the pre-mixed cream style can shown in Figure 1 the innermost or critical point received only 7% of the lethal heat for sterilization. Thus, as will be apparent, my earlier invention marked a step forward in solving the problem existing in the sterilization of cream style corn.

Although my issued Patent No. 2,502,197 is directed broadly to the stratification of the cream phase or finely divided corn in one layer and the discrete corn particles with the brine in a separate layer before sterilization, it is particularly directed to a process of sterilizing cream style corn containing 30 to 65% and preferably 45 to 60% by weight of corn kernels selected from the class consisting of whole corn kernels and parts of whole corn kernels and the remainder a sauce or cream phase containing 8 to 90% (and preferably between 35 and 60%) of finely divided corn grains in added water. The process comprises the heat sterilization of this product in a container (can or jar) while the added water contains not more than 35%, and preferably not more than 25%, of its weight of the finely divided corn grains with the said corn kernels and the remainder of finely divided corn grains are substantially stratified in layers. It is desirable that from at least 50% to 100% of the finely ground material pass through an 8 mesh sieve. The stratification in the container is preferably effected by filling first the layer 12 of kernel material 13 in brine and subsequently filling the container with the layer 11 of cream phase material longitudinally extended over the top of the container. However, the order of filling the component layers into the can is not important. Optionally, the cream phase may be stratified as two layers: one at the top and the other at the bottom of the container, with the added water layer containing the whole kernels in between, for even more efficient sterilization.

While the process of my issued patent effects a great time saving (from 40 to 60%) in sterilizing cream style corn with a resulting improvement in nutritive and organoleptic qualities, I have found that the finely divided component layer 11 or cream phase acquires a firm texture or "packed effect" during sterilization which resists the mixing effect of shaking the container or other mechanical treatment when one desires to mix the stratified layers prior to serving.

I have discovered that when solids of the soluble type are incorporated uniformly in substantial proportions into the finely divided layer or cream phase of the cream style corn product to be sterilized according to the stratified process, there is a substantial reduction of the resistance of this component layer to dispersion under mechanical agitation which facilitates the mixing of the component layers into a final product of homogeneous nature. I have furthermore discovered that by placing most of (at least 50%) the soluble solids, particularly sugar, introduced into the product during formulation, in said cream phase layer, rather than in the whole kernel layer, there is a greater preservation of the original color and flavor in the product. This results to a large extent from the fact that the layer containing the discrete corn particles and the bulk of the water is subjected to more intense heating because of its more rapid heat transfer than the slower heating cream phase. Since many of these soluble solids are heat sensitive, particularly sugar which has a tendency to caramelize, as well as the vitamins, edible oils and other liquids containing dissolved solids, they decompose somewhat to the detriment of flavor, color, odor and nutritive quality. Thus by placing these soluble solids in the slower heating cream phase a dual advantage is achieved.

My invention particularly comprises incorporating into the cream phase, or finely divided layer, of the stratified cream style corn, a major proportion (at least 50%) up to substantially all of the soluble solids, especially sugar, introduced into the product during formulation. Quantitatively, when speaking of sugar this comprises incorporating from 10 to 50% of added sugar by weight of the liquid phase in the finely divided layer. Preferred results are obtained with from 12 to 35% of added sugar and it is most desirable to use from 15 to 25%. The actual amount of sugar to be used will depend on a number of factors, including the age of the raw corn, the proportion between the weight of cream phase and total weight of product, the desire for sweetness in product, and others. Within reasonable limits a maximum amount of added sugar has been found to be that which equals about 50% of the weight of the liquid content of the cream phase after the sugar has been incorporated. A practical minimum is about 10%. Sugar as used in this specification refers to sucrose and other sweet and soluble mono- and di-saccharides. The sucrose may be derived from any usually accepted source, such as either beets or cane.

Examples of other edible substances than sugar which may be incorporated into the cream phase of the corn product are table salt, monosodium glutamate, the water soluble vitamins and minerals, and the essential oils.

The amounts of the edible, soluble solids incorporated into the cream phase may vary over wide limits. The concentration ranges of sugar set out above are preferred. Sugar is one of the most susceptible of all to the deterioration of its organoleptic properties by heat. It has a tendency to caramelize when heated which is manifested by changes in color and flavor, as well as chemical composition. Sugar has also outstanding properties for increasing the volume of the liquid and enhancing the lubricating ability of the liquid in the cream phase. Thus sugar is normally ideally suited for incorporation in the cream phase layer.

The other soluble solids normally present in cream style corn, while imparting advantages when incorporated into the cream phase, are not as important as sugar. Salt is usually used in relatively small quantities in cream style corn. When added to the cream phase it is recommended that it be added in an amount between 1.5 and 8% of the liquid present in the cream phase. It is preferred that between 2 and 6% be used. Best results are obtained with between 2.5 to 3.5% salt. Because of the lesser part played by salt and soluble solids other than sugar, these materials may be distributed in the cream phase to a lesser extent without a significant variation in physical properties. However, where these soluble solids are unstable to prolonged heating, it is highly advantageous to arrange for their distribution in the cream phase layer.

It is sometimes advantageous to place certain soluble solids in the phase which receives the most severe heat treatment, namely, the aqueous layer containing the discrete whole kernels. For example, it is often advantageous to incorporate most of or all of the salt in the whole kernel phase because of its ability to retard darkening of the corn product. Salt does not impart a great increase in viscosity or volume to the cream phase liquid and thus is not of great importance to this phase. The reason for the apparent anti-discoloring effect of salt is not known. Sugar, on the other hand, because of the advantageous properties described above, is important to the invention and is advantageously placed in the cream phase.

It might occur to one that the resistance of the cream phase to mixing after sterilizing would be overcome by means of the addition of water to the cream phase. This would appear to reduce the viscosity and aid in preventing "packing" of the cream phase. This is an impractical measure, for water has a very low viscosity and when this is added to the cream phase, the viscosity of the cream phase is lowered so that it will not maintain a stratified position when filled into a can. Thus the practical value of sterilization of a stratified product is lost. Furthermore, to obtain the proper resistance to "packing" in the cream phase so much water would be required that the consistency of the final mixed product would be too low.

It is believed that the correction of the tendency to pack and resist remixing of the cream phase layer of stratified cream style corn products is accomplished by the increasing of the volume of the liquid component of the cream phase when soluble solids are added. The cream phase of stratified cream style corn invariably contains a liquid solvent, water, as a vehicle. Soluble solids, and particularly sugar, added to or present in the cream phase, manifests and affinity for the solvent. Thus the soluble solids hold captive a considerable amount of water, which is uniformly distributed among the fine, non-soluble particles of cream phase. As has been established by the physical laws of solution, all of the free solvent uniformly dissolves the soluble solids in the material. Thus if 100 g. of water soluble solids is added to the cream phase containing 100 g. of water, a 50% solution of the soluble solids is formed which is uniformly distributed throughout the material. Since the volume of the solution containing the soluble solids is greater than the volume of the water which was in the material, the non-soluble particles becomes farther separated from each other. This results, in the case of most water soluble solids, in a solution having better lubricating powers than does plain water. This enhancement of lubricating properties augments the reduction in resistance to mixing of the sterilized corn product.

To obtain an effect which is of sufficient magnitude to be of significant practicability, I have discovered that the expansion in volume of the liquid content of the cream phase or finely divided component must be at least 8%. The following discussion will illustrate what conditions are required to produce 8% of expansion in volume of the liquid content of the cream phase of stratified cream style corn. The normal liquid content of cream style corn is water containing the natural soluble solids of the corn, which are of comparatively small amount. For example, in the cream phase of the product, the natural soluble solids content of the corn itself is 7% of the liquid content, as a maximum. Assuming that all of the natural soluble solids is sugar, which is not true since there are small quantities of soluble minerals, vitamins, etc., the volume of the solution in the above mentioned cream phase would be approximately 4.64% greater than the water of the liquid content would occupy as pure water. The liquid content of the cream phase may vary from approximately 70% to approximately 88% of the material, depending primarily on the stage of maturity of the raw material. In very young corn, the proportion of liquid content to solid content is high but the proportion of soluble solids to insoluble solids also is relatively high. Conversely, in corn which is considerably advanced in maturity, both the liquid and the soluble solids portions are comparatively smaller relative to the insoluble solids portion of the material than in very young corn.

In practice, the liquid content of the cream phase, when packed in the can, includes not only the natural liquid of the corn but also a quantity of water produced by condensation of steam by means of which the material is heated prior to filling. This additional water, on the average, amounts to approximately 15% of the total weight of the material. The percentage of natural dissolved solids in the liquid content of cream phase produced from corn of a comparatively advanced stage of maturity, at the time of filling, may be as low as 4%, while in material produced from very young corn, the percentage may approach 7%. Since there is contemplated the addition of the sugar, sucrose, to the finely ground component, it will be assumed for purposes of comparison that all sugar is sucrose even though the natural soluble solids in corn are not sucrose, but other forms of sugar along with other carbohydrates, including starch. A 4% solution of sucrose at 68° F. has a volume approximately 2.45% greater than the volume the water would have without any sucrose. A 7% solution of sucrose at 68° F. has a volume approximately 4.64% greater than the water of the solution would occupy as pure water.

To increase the volume of the liquid content of the cream phase by 8% would require, in the case of the material having a 4% solution of natural solids, sugar in the amount of 12.4% of the weight of the original liquid content, of 10.07% of the weight of the final liquid content, or of 7.04% of the total weight of cream phase, which contains 30% of insoluble solids, would have to be added. In the case of the material having the 7% solution of natural solids, sugar would have to be added in the amount of 12.2% of the weight of the original liquid content, of 9.28% of the weight of the final liquid content, or of 8.17% of the total weight of cream phase, which contains 12% of insoluble solids.

The magnitude of the effect of added sugar in increasing the volume of the liquid in the cream phase is indicated by Table 1 which follows. The first and third columns give the percentage of sucrose by weight in the resultant solution of sugar in water, and the second and fourth columns, the respective, corresponding percentages of increase in volume over that of the water in the resultant solution when in the form of pure water. All values apply to temperature of 68° F.

TABLE 1

| Sucrose by Weight (Brix), Percent | Increase in Volume over Pure Water, Percent | Sucrose by Weight (Brix), Percent | Increase in Volume over Pure Water, Percent |
|---|---|---|---|
| 4 | 2.45 | 24 | 19.51 |
| 6 | 3.88 | 26 | 21.74 |
| 8 | 5.36 | 28 | 24.04 |
| 10 | 6.84 | 30 | 26.48 |
| 11.51 | 8.00 | 32 | 29.14 |
| 12 | 8.36 | 34 | 32.00 |
| 12.77 | 9.00 | 36 | 34.86 |
| 14 | 9.97 | 38 | 38.04 |
| 16 | 11.66 | 40 | 41.42 |
| 18 | 13.45 | 42 | 45.03 |
| 20 | 15.35 | 44 | 48.99 |
| 22 | 17.42 | 46 | 53.08 |
|  |  | 48 | 57.47 |
|  |  | 50 | 61.90 |

This table clearly shows how the rate of increase in volume with each additional unit percentage of sucrose increases greatly when the increase in volume is greater than 8%.

When soluble solids go into solution in a liquid, they not only increase the volume of their liquid solvent, but they also increase its viscosity. This higher viscosity in the liquid content of cream phase assists in retaining "body" or stiffness in the cream phase so that it can be readily filled in the stratified state and will maintain itself in the stratified state during the process.

The viscosity of sucrose solutions at 68° F. in centipoises, relative to water, is given in Table 2 which follows:

TABLE 2

| Sucrose by Weight, percent | .0 | .1 | .2 | .3 | .4 | .5 | .6 | .7 | .8 | .9 |
|---|---|---|---|---|---|---|---|---|---|---|
| 0 | 1.000 | 1.026 | 1.053 | 1.082 | 1.113 | 1.145 | 1.179 | 1.215 | 1.253 | 1.295 |
| 10 | 1.336 | 1.381 | 1.430 | 1.481 | 1.535 | 1.593 | 1.655 | 1.721 | 1.791 | 1.866 |
| 20 | 1.947 | 2.034 | 2.127 | 2.227 | 2.334 | 2.451 | 2.576 | 2.712 | 2.859 | 3.019 |
| 30 | 3.192 | 3.381 | 3.587 | 3.812 | 4.059 | 4.330 | 4.630 | 4.959 | 5.324 | 5.729 |
| 40 | 6.18 | 6.68 | 7.25 | 7.88 | 8.59 | 9.40 | 10.31 | 11.35 | 12.54 | 13.90 |
| 50 | 15.47 | 17.28 | 19.38 | 21.87 | 24.73 | 28.14 | 32.20 | 37.05 | 42.89 | 49.97 |

In the above table the column headings indicate the fractions of the intervals between successive values given in the first column. Thus each tenth indicates 1% to be added to the sucrose content in the first column.

After the stratified cream style corn has been sterilized and is ready for use, it is usually necessary to subject the can to mechanical agitation in order to mix the contents. Stratified cream style corn which is formulated and filled to the proper consistency in the cream phase, but without extra soluble solids being incorporated into it, may be shaken in a reciprocating movement at a speed of 375 cycles per minute through an amplitude of 2 inches for a period of 30 seconds without satisfactory dispersal of the cream phase or finely divided component throughout the container, whereas an identical product, except that sugar has been added to the cream phase in the amount of 21 percent of the weight of that component, became well mixed during only 15 seconds of similar shaking.

In order more clearly to disclose the nature of the present invention, the following examples illustrating the preparation of typical cream style corn products according to the invention will be hereinafter described. It should be understood, however, that this is done solely by way of example and is intended neither to delineate the scope of the invention nor limit the ambit of the appended claims.

The cream style corn products of these examples are made from succulent sweet corn kernels, water, sugar and salt. The ears of corn are husked either mechanically or by hand and the kernels are cut from the cob in the manner followed by packers of whole kernel corn. The corn used in preparing this product may be free of corn silks, cob tissues and worms and produced in accordance with the methods disclosed in United States Letters Patent Nos. 2,484,375 and 2,484,376, both of October 11, 1949, to Ralph Cover and assigned to The United Products Company.

Example 1

A cream corn product in No. 10 cans was prepared containing approximately 43 percent of whole kernels and a sauce which was composed of approximately 43% of finely divided corn, 9.6% of added sugar, 1.7% of added salt, 1.7% of added starch, and 44% of added water, including steam condensate in the cream component. Of this product, the finely divided, or cream component, as filled into the containers after heating with steam, was made up of 58.4% of water, which contained natural soluble solids, added sugar, and added salt in proportions of 6%, 18.1% and 3.3%, respectively, by weight of the final liquid phase in the cream component. This component also contained 17% of insoluble solids from the ground up corn and 2.5% of added starch. A typical procedure for filling, closing and processing the preparation in the cans was as follows: Into each can was first placed 46.5 ounces of heated whole kernels, then 21 ounces of water at practically boiling temperature, followed by 41 ounces of heated cream component constituted as described above. After the cans were filled, they were sealed and placed top end up, into a steam retort. When the average temperature of the ingredients upon filling was 170° F., the cans were sterilized for 100 minutes at 240° F. After sterilization, the cans were cooled in water and then optionally agitated to ensure a uniform distribution of all components throughout the product. The sterilized product was excellent in taste, flavor, odor and appearance. There was no evidence of caramelization.

Example 2

A cream corn product in No. 303 cans was prepared containing approximately 38% of whole kernels and a sauce which was composed of approximately 50% of finely divided corn, 13.6% of added sugar, 1.4% of added salt, 1.8% of added starch, and 33.2% of added water. Of this product, the finely divided cream component, as filled into the container, was made up of 55.8% of water which contained natural soluble solids and added sugar in proportions of 4.8% and 24%, respectively, by weight of the final liquid phase in the cream component. This component also contained 19% of insoluble solids from the ground up corn and 2.5% of added starch. Into each can was first placed 3¾ ounces of the cream component constituted as described above, then 6 ounces of whole kernels, then 3 ounces of brine containing .15 ounce of salt, followed by 4¼ more ounces of the cream component. The ingredients were filled at a temperature of approximately 70° F. As soon as filled, the cans were sealed under a vacuum equivalent to 20 inches of mercury and, while being held in upright position with the lids of the cans on the upper ends, were processed 58 minutes at 245° F. After sterilization, the cans were cooled in water and then optionally agitated to ensure a uniform distribution of all components throughout the product. The sterilized product was excellent in taste, flavor, odor and appearance; with no evidence of caramelization.

Example 3

A cream corn product in No. 303 cans was prepared containing approximately 38% of whole kernels and a sauce which was composed of approximately 50% of finely divided corn, 12.7% of added sugar, 1.9% of added salt, 1.6% of added starch, and 33.8% of added water, including steam condensate in the cream. Of this product, the finely divided cream component, as filled into the container after heating with steam, was made up of 61.2% of water which contained natural soluble solids, added sugar, and added salt in proportions of 5%, 15%, and 1.8%, respectively, by weight of the final liquid phase in the cream component. This component also contained 19% of insoluble solids from the ground up corn and 2.5% of added starch. Into each can was first placed 7.4 ounces of whole kernels, then 3.7 ounces of brine containing .09 ounce of salt and .5 ounce of sugar, followed by 6.5 ounces more of the cream component. The ingredients were filled at a temperature of approximately 180° F. As soon as filled, the cans were sealed and, while being held in upright position with the lids of the cans on the upper ends, were processed 58 minutes at 245° F. After sterilization, the cans were cooled in water and then optionally agitated to ensure a uniform distribution of all components throughout the product. The sterilized product was found to be excellent in flavor, taste, odor and appearance. There was no evidence of caramelization.

Example 4

A cream corn product in No. 10 cans was prepared containing approximately 34% of whole kernels and a sauce which was composed of approximately 52% of finely divided corn, 9.4% of added sugar, 1.6% of added salt, 1.8% of added starch, and 35.2% of added water, included steam condensate in the cream component. Of this product, the finely divided, or cream component, as filled into the containers after heating with steam, was made up of 63.8% of water, which contained natural soluble solids and added sugar in proportions of 5.5% and 14.2%, respectively, by weight, of the final liquid phase in the cream component. This component also contained 18% of insoluble solids from the ground up corn and 2.5% of added starch. A typical procedure for filling, closing and processing the preparation in the cans was as follows: Into each can was first placed 25 ounces of heated cream component constituted as described above, then 37 ounces of heated whole kernels, then 18 ounces of brine containing 1.1 ounces of salt at practically boiling temperature, and finally 28 ounces more of heated cream component. After the cans were filled, they were sealed and placed top end up, into a steam retort. When the average temperature of the ingredients upon filling was 170° F., the cans were sterilized for 115 minutes at 242° F. After sterilization, the cans were cooled in water and then optionally agitated to ensure a uniform distribution of all components throughout the product. The sterilized product was excellent in taste, flavor, odor and appearance. There was no evidence of caramelization.

As an alternative to heat sterilizing the containers in an upright position as described in the foregoing examples, one may place the containers in a position whereby their longitudinal axes are in a substantially horizontal position.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of sterilizing a cream style canned corn product, which process reduces the amount of caramelization inherent to heat sterilization, said process comprising heat sterilizing a stratified product filled in a container, said stratified product comprising a whole kernel-containing liquid layer and a cream phase layer, said cream phase layer containing at least 50% of the sugar introduced into the product during formulation; the resulting sterilized product having increased susceptibility to mixing within the closed container when subjected to mechanical agitation.

2. The process of sterilizing a cream style canned corn product, which process reduces the amount of caramelization inherent to heat sterilization, said process comprising heat sterilizing a stratified product filled in a container, said stratified product comprising a whole kernel-containing liquid layer and a cream phase layer, said cream phase layer containing at least 50% of the soluble solids introduced into the product during formulation; the resulting sterilized product having increased susceptibility to mixing within the closed container when subjected to mechanical agitation.

3. The process of sterilizing a cream style canned corn product, which process reduces the amount of caramelization inherent to heat sterilization, said process comprising heat sterilizing a stratified product held in a container, said stratified product comprising a whole kernel-containing liquid layer and a cream phase layer, said cream phase layer containing from 10 to 50% of added sugar by weight of liquid phase in the cream phase layer; the resulting sterilized product having increased susceptibility to mixing within the closed container when subjected to mechanical agitation.

4. The process of sterilizing a cream style canned corn product, which process reduces the amount of caramelization inherent to heat sterilization, said process comprising heat sterilizing a container filled with a stratified product, said stratified product comprising a whole kernel-containing liquid layer and a cream phase layer, said cream phase layer containing substantially all of the sugar introduced into the product during formulation; the resulting sterilized product having increased susceptibility to mixing within the closed container when subjected to mechanical agitation.

5. The process of sterilizing a cream style canned corn product, which process reduces the amount of caramelization inherent to heat sterilization, said process comprising heat sterilizing a stratified product held in a container, said stratified product comprising a whole kernel-containing liquid layer and a cream phase layer, said cream phase layer containing substantially all of the soluble solids introduced into the product during formulation; the resulting sterilized product having increased susceptibility to mixing within the closed container when subjected to mechanical agitation.

6. The process defined by claim 3, wherein the cream phase layer contains from 15% to 25% of added sugar by weight of liquid phase in the cream phase layer.

7. The process defined by claim 1, wherein the kernel-containing liquid layer contains at least 50% of the salt introduced into the product during formulation, the cream phase layer containing at least 50% of the soluble solids introduced into the product during formulation.

8. The process defined by claim 1, wherein the cream phase containing at least 50% of the sugar introduced into the product during formulation is divided into two layers separated by the kernel-containing liquid layer.

References Cited in the file of this patent

UNITED STATES PATENTS

| | | |
|---|---|---|
| 2,502,196 | Ball | Mar. 28, 1950 |
| 2,502,197 | Ball | Mar. 28, 1950 |
| 2,592,988 | Whitmore et al. | Apr. 15, 1952 |